United States Patent
Hong et al.

(10) Patent No.: US 11,035,774 B2
(45) Date of Patent: Jun. 15, 2021

(54) BIOSENSOR

(71) Applicant: National Tsing Hua University, Hsinchu (TW)

(72) Inventors: Chien-Chong Hong, Zhubei (TW); Jheng-Ying Wu, Gukeng Township (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 120 days.

(21) Appl. No.: 16/370,133

(22) Filed: Mar. 29, 2019

(65) Prior Publication Data

US 2020/0232897 A1    Jul. 23, 2020

(30) Foreign Application Priority Data

Jan. 18, 2019    (TW) .................................. 108101955

(51) Int. Cl.
*G01N 15/06*    (2006.01)
*B06B 1/06*    (2006.01)
(Continued)

(52) U.S. Cl.
CPC ........ *G01N 15/0606* (2013.01); *B01L 3/5027* (2013.01); *B06B 1/0603* (2013.01);
(Continued)

(58) Field of Classification Search
CPC ....... G01N 15/0606; G01N 2015/0065; G01N 29/022; G01N 5/02; B06B 1/0603;
(Continued)

(56) References Cited

U.S. PATENT DOCUMENTS

| 7,446,870 B2 * | 11/2008 | Arndt ................. G01N 15/0606 356/335 |
| 2013/0260481 A1 * | 10/2013 | Shimizu ............ B01L 3/502761 436/501 |
| 2016/0172577 A1 | 6/2016 | Hong et al. |

FOREIGN PATENT DOCUMENTS

| JP | 2009-517682 A | 4/2009 |
| TW | 201602572 A | 1/2016 |
| TW | I631819 B | 8/2018 |

OTHER PUBLICATIONS

Huan Wen Chen, et al. "Electrodeposition of Piezoelectric Polymer Ultrasonic Transceivers for On-Chip Antibiotic Biosensors", Feb. 2016, The Electrochemical Society, 163, B200-B205 (Year: 2016).*

(Continued)

*Primary Examiner* — Matthew D Krcha
*Assistant Examiner* — Henry H Nguyen
(74) *Attorney, Agent, or Firm* — Birch, Stewart, Kolasch & Birch, LLP

(57) ABSTRACT

A biosensor for detecting the presence of a target compound in a test solution is disclosed. The biosensor includes upper and lower carrier plates, a spacer film with a micro-channel, an inlet port upstream of the micro-channel, an outlet port downstream of the micro-channel, a micro-machined transceiver, and a first molecularly imprinted polymer layer for recognizing and binding the target compound. The micro-machined transceiver includes a micro-machined transmitter for generating an acoustic wave, and micro-machined receiver for generating an acoustic wave-induced voltage. An amplitude of the acoustic wave-induced voltage is varied in response to the concentration of the target compound.

7 Claims, 14 Drawing Sheets

(51) Int. Cl.
  *G01N 29/032* (2006.01)
  *G01N 29/24* (2006.01)
  *B01L 3/00* (2006.01)
  *G01N 29/02* (2006.01)
  *G01N 15/00* (2006.01)

(52) U.S. Cl.
  CPC ......... *B06B 1/0688* (2013.01); *G01N 29/022* (2013.01); *G01N 29/032* (2013.01); *G01N 29/2437* (2013.01); *B01L 2300/0645* (2013.01); *B01L 2300/0803* (2013.01); *B01L 2400/0409* (2013.01); *G01N 2015/0065* (2013.01)

(58) Field of Classification Search
  CPC ................. B06B 1/0607; B06B 1/0688; B01L 2400/0409; B01L 2300/0645; B01L 2300/0663; B01L 2300/0803; B01L 3/5027
  See application file for complete search history.

(56) References Cited

OTHER PUBLICATIONS

Chien-Chong Hong, et al. "A disposable microfluidic biochip with on-chip molecularly imprinted biosensors for optical detection of anesthetic propofol", Aug. 2010, Biosensors and Bioelectronics, 25, 9, p. 2058-2064 (Year: 2010).*
Frasco, Manuela F et al. "Imprinting Technology in Electrochemical Biomimetic Sensors." Sensors (Basel, Switzerland) vol. 17,3 523. Mar. 6, 2017, doi:10.3390/s17030523 (Year: 2017).*
G. Meineke et al. "Microfluidic opto-caloric switch for sorting of particles with 3D-hydrodynamic focusing based on SLE fabrication capabilities," 2016, Lab Chip, 16, 820-828 (Year: 2016).*
Pietrzyk et al., "Selective Histamine Piezoelectric Chemosensor Using a Recognition Film of the Molecularly Imprinted Polymer of Bis(bithiophene) Derivatives", 2009, Anal. Chem., vol. 81, No. 7. (Year: 2009).*
Taiwanese Search Report corresponding Taiwanese Application No. 108101955, dated Sep. 19, 2019,with English translation.

* cited by examiner

BIOSENSOR

CROSS-REFERENCE TO RELATED APPLICATION

This application claims priority from Taiwanese invention patent application no. 108101955, filed on Jan. 18, 2019.

FIELD

The disclosure relates to a biosensor, more particularly to a biosensor having at least one micro-machined transceiver.

BACKGROUND

U.S. patent application publication No. US 2018/0331278 A1 discloses a conventional biosensor. As shown in FIG. 1, the conventional biosensor includes a micro-machined transceiver 1 which has a micro-machined transmitter 11 and a micro-machined receiver 12. The micro-machined transmitter 11 includes a positive patterned electrode 111, a negative patterned electrode 112, and a first patterned piezoelectric layer 113 formed on the first patterned electrode 111. The micro-machined receiver 12 has a configuration similar to the micro-machined transmitter 11, and includes a positive patterned electrode 121, a negative patterned electrode 122, and a second patterned piezoelectric layer 123 formed on the first patterned electrode 121.

There is a need for developing a biosensor with substantially improved specificity and sensitivity for a target compound.

SUMMARY

An object of the disclosure is to provide a novel biosensor with substantially improved specificity and sensitivity for a target compound.

According to the disclosure, a biosensor for detecting the presence of a target compound in a testing solution includes an upper carrier plate, a lower carrier plate, a spacer film, an inlet port, a first outlet port, a micro-machined transceiver, and a first molecularly imprinted polymer layer. The lower carrier plate is spaced apart from the upper carrier plate to define an accommodation zone therebetween. The spacer film has a micro-channel, and is disposed in the accommodation zone. Each of the inlet port and the first outlet port is formed in one of the upper and lower carrier plates. The inlet port is configured to permit the testing solution to be introduced into the micro-channel. The first outlet port is configured to permit the testing solution to be discharged out of the micro-channel. The micro-machined transceiver includes a micro-machined transmitter and a micro-machined receiver. The micro-machined transmitter includes a first electrode set and a first patterned piezoelectric layer. The first electrode set is formed on a lower surface of the upper carrier plate, and has a positive patterned electrode and a negative patterned electrode which is separated from the positive patterned electrode by a first gap therebetween. The first patterned piezoelectric layer is formed on one of the positive and negative patterned electrodes of the first electrode set, and is configured such that when an alternate voltage is applied to the positive and negative patterned electrodes of the first electrode set, an acoustic wave is generated via a converse piezoelectric effect of the first patterned piezoelectric layer. The micro-machined receiver includes a second electrode set and a second patterned piezoelectric layer. The second electrode set is formed on an upper surface of the lower carrier plate, and has a positive patterned electrode and a negative patterned electrode which is separated from the positive patterned electrode by a second gap therebetween. The second patterned piezoelectric layer is formed on one of the positive and negative patterned electrodes of the second electrode set, and is in a position corresponding to the first patterned piezoelectric layer such that when the acoustic wave is transmitted to the second patterned piezoelectric layer through the testing solution, an acoustic wave-induced voltage is generated between the positive and negative patterned electrodes of the second electrode set via a piezoelectric effect of the second patterned piezoelectric layer. The first molecularly imprinted polymer layer is formed on one of the first and second patterned piezoelectric layers, and is configured to recognize and bind the target compound in the testing solution such that an amplitude of the acoustic wave-induced voltage is varied in response to the concentration of the target compound in the testing solution.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Figure 1:
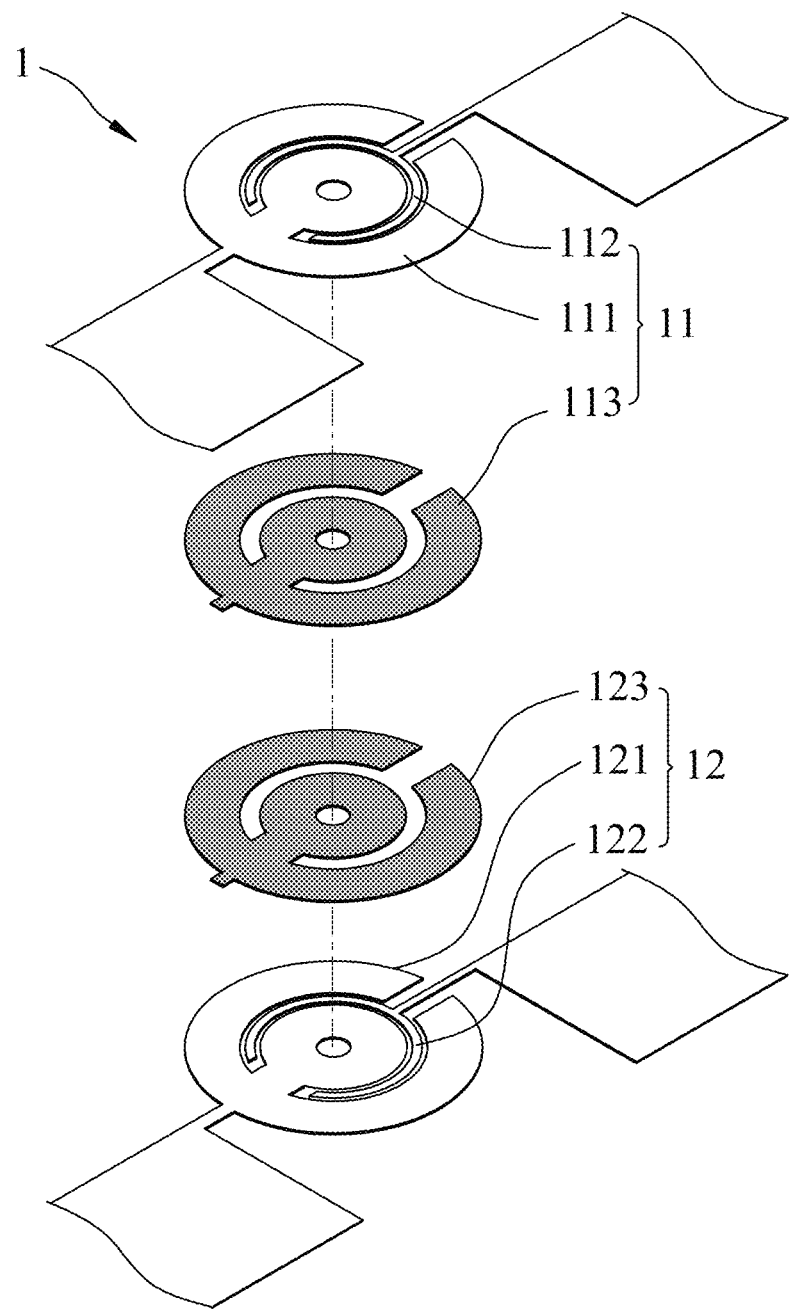
FIG. 1 is a fragmentary exploded perspective view of a micro-machined transceiver in a conventional biosensor.

Before the disclosure is described in greater detail, it should be noted that where considered appropriate, reference numerals have been repeated among the figures to indicate corresponding or analogous elements, which may optionally have similar characteristics.

To aid in describing the disclosure, directional terms may be used in the specification and claims to describe portions of the present disclosure (e.g., front, rear, left, right, top, bottom, etc.). These directional definitions are intended to merely assist in describing and claiming the disclosure and are not intended to limit the disclosure in any way.

First Embodiment

Figure 2:
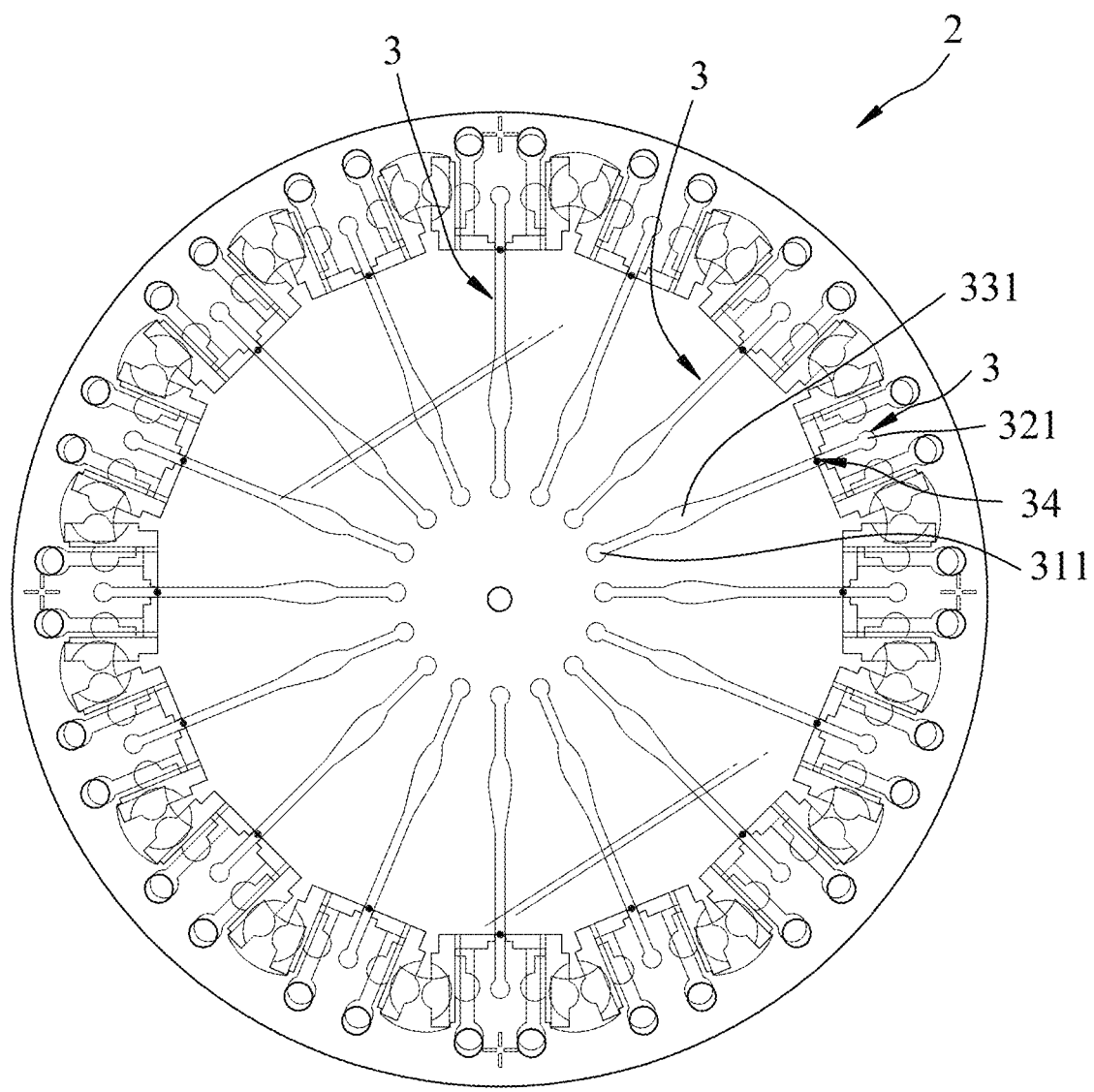
FIG. 2 is a plan view of a sensor disc including a plurality of biosensors according to a first embodiment of the disclosure.
Figure 3:
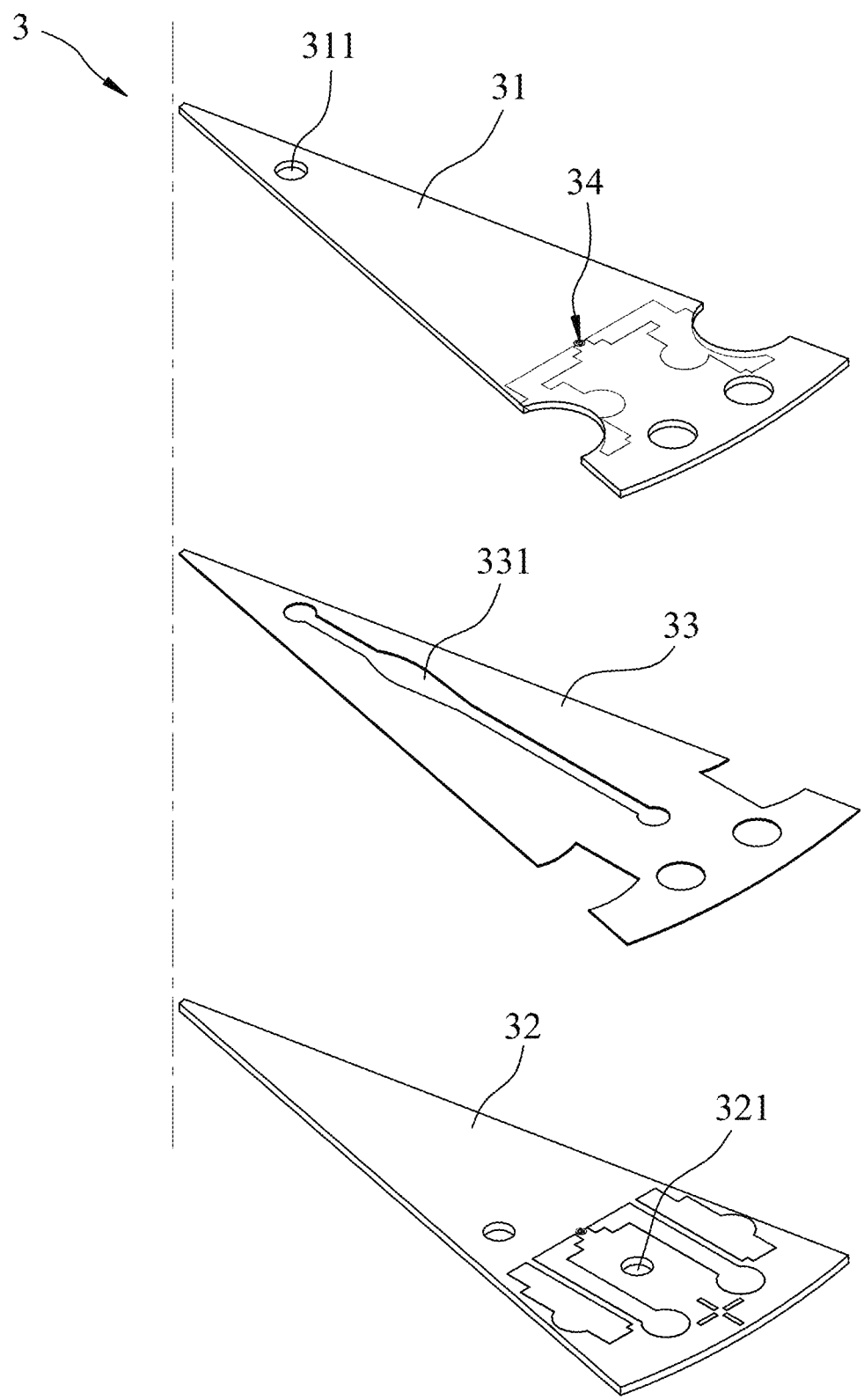
FIG. 3 is a fragmentary exploded perspective view of one of the biosensors of the first embodiment.
Figure 4:
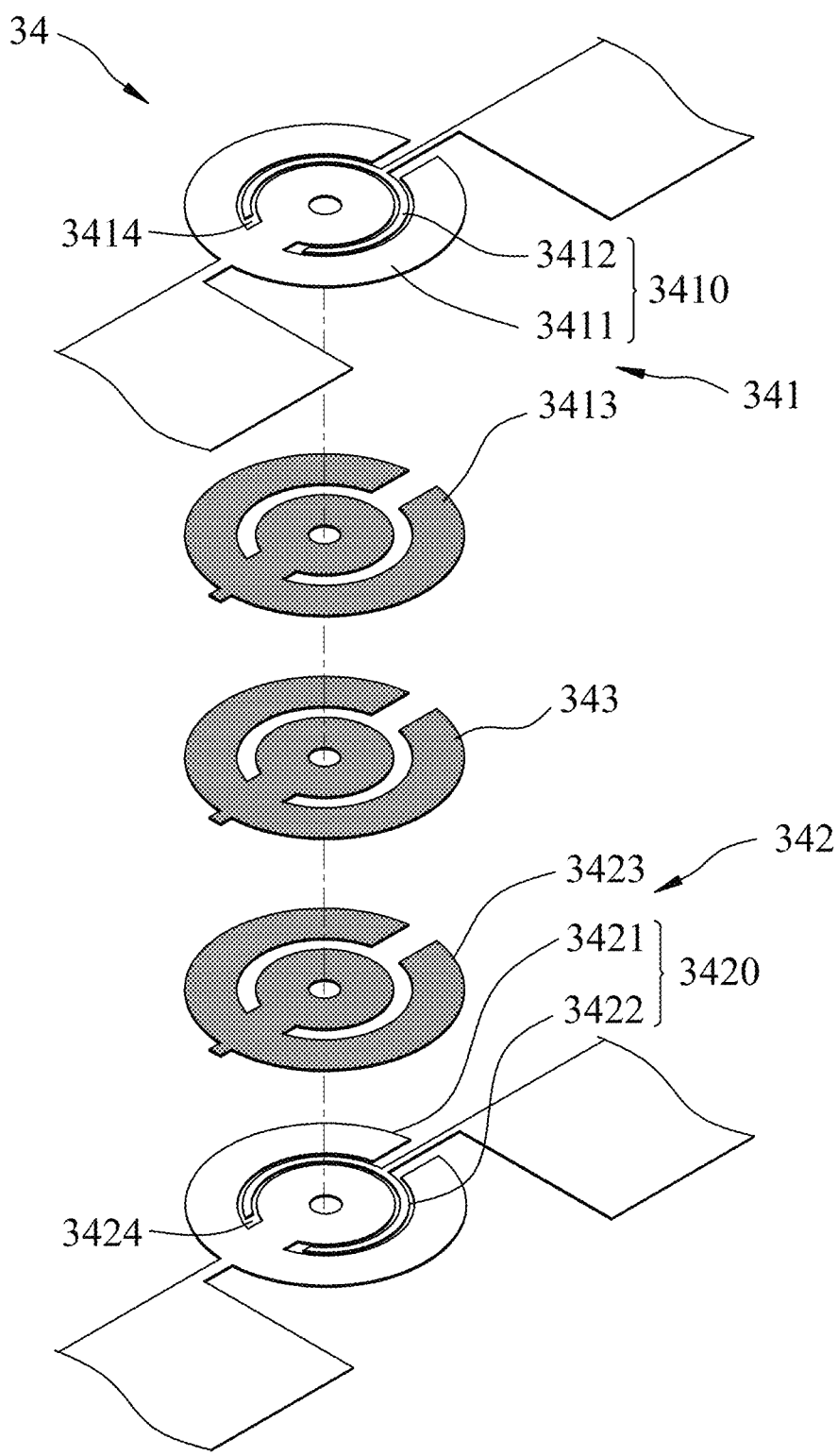
FIG. 4 is a fragmentary exploded perspective view of a micro-machined transceiver in the biosensor of the first embodiment.

Referring to FIGS. 2 to 4, a sensor disc 2 is shown to include a plurality of biosensors 3 according to a first embodiment of the disclosure. The biosensors 3 are for detecting the presence of a target compound 61 in a testing solution 6 (see FIG. 8), and are useful for analysis of residue of veterinary drugs and growth-promoting agents in food-producing animals, residue of insecticides and pesticides in vegetables and fruits, food additives in foods, and so on. Each of the biosensors 3 includes an upper carrier plate 31, a lower carrier plate 32, a spacer film 33, an inlet port 311, a first outlet port 321, a micro-machined transceiver 34, and a first molecularly imprinted polymer layer 343.

Figure 8:
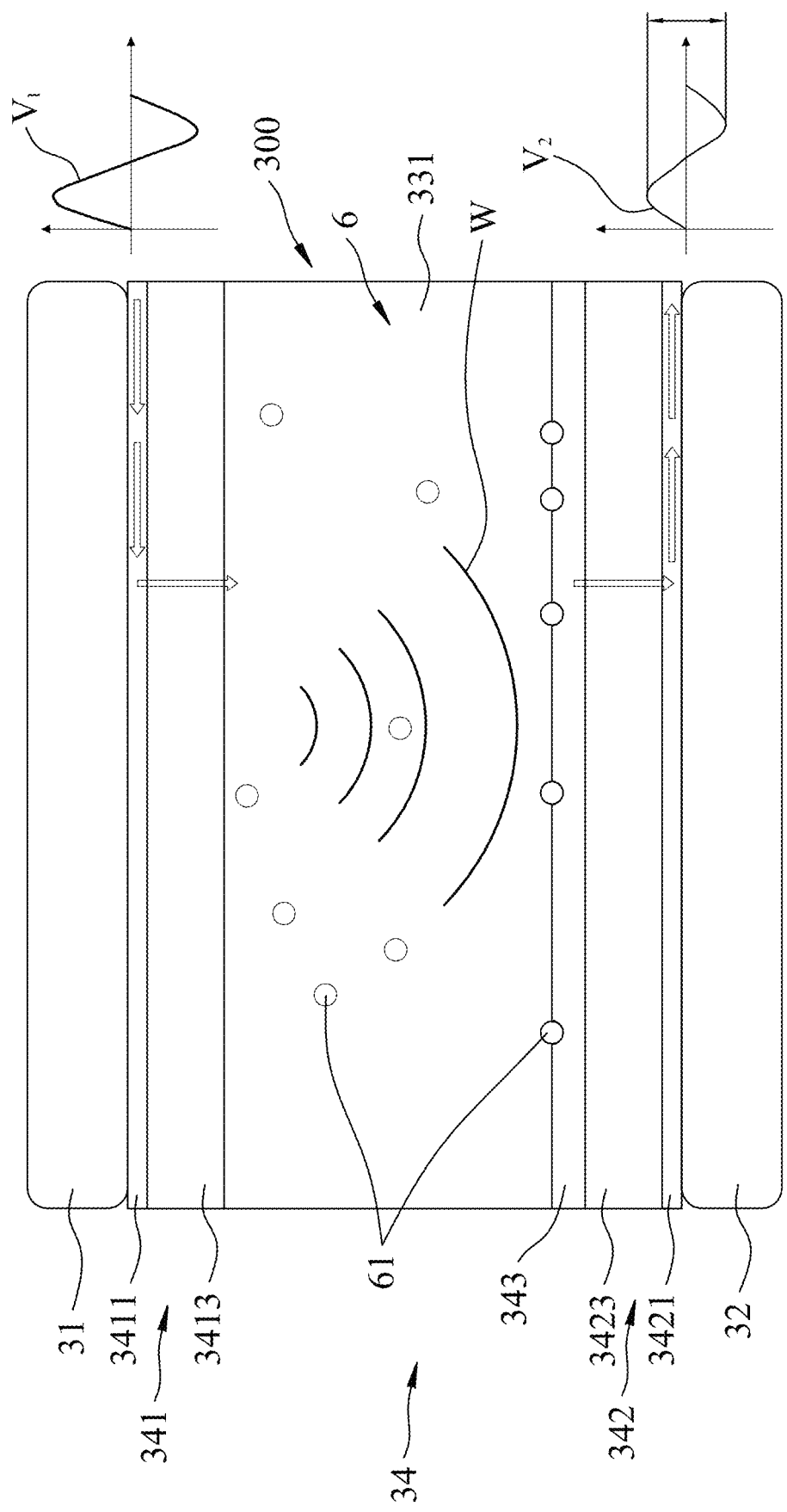
FIG. 8 is a schematic side view illustrating a working mechanism of the micro-machined transceiver of FIG. 4.

The lower carrier plate 32 is spaced apart from the upper carrier plate 31 to define an accommodation zone 300 therebetween (see also FIG. 8).

The spacer film 33 has a micro-channel 331 which is elongated, and is disposed in the accommodation zone 300. In an embodiment, the spacer film 33 is made of a double-sided tape having a thickness of 60 microns. The double-sided tape is patterned to form the micro-channel 331 using a mold (not shown) which is made by a CNC (computer-numerical-control) machine tool.

In an embodiment shown in FIGS. 2 and 3, the upper carrier plates 31 of the biosensors 3 are integrally formed into a cyclic olefin copolymer (COC) wafer, the lower carrier plates 32 of the biosensors 3 are integrally formed into a COC wafer, and the spacer films 33 of the biosensors 3 are integrally formed.

As shown in FIG. 3, each of the inlet port 311 and the first outlet port 321 is formed in one of the upper and lower carrier plates 31, 32. The inlet port 311 is configured to permit the testing solution 6 (see FIG. 8) to be introduced into the micro-channel 331. The first outlet port 321 is configured to permit the testing solution 6 to be discharged out of the micro-channel 331.

In an embodiment shown in FIG. 3, the inlet port 311 and the first outlet port 321 are formed in the upper and lower carrier plates 31, 32, respectively, and each is circular.

The micro-machined transceiver 34 includes a micro-machined transmitter 341 and a micro-machined receiver 342.

The micro-machined transmitter 341 includes a first electrode set 3410 and a first patterned piezoelectric layer 3413.

The first electrode set 3410 is formed on a lower surface of the upper carrier plate 31, and has a positive patterned electrode 3411 and a negative patterned electrode 3412 which is separated from the positive patterned electrode 3411 by a first gap 3414 therebetween. In Example 1, as shown in FIG. 4, the positive and negative patterned electrodes 3411, 3412 are arranged in a concentric manner, and each is made of gold.

The first patterned piezoelectric layer 3413 is formed on one of the positive and negative patterned electrodes 3411, 3412 of the first electrode set 3410, and is configured such that when an alternate voltage ($V_1$) is applied to the positive and negative patterned electrodes 3411, 3412 of the first electrode set 3410, an acoustic wave (W) is generated via a converse piezoelectric effect of the first patterned piezoelectric layer 3413 (see FIGS. 4 and 8). The first patterned piezoelectric layer 3413 is made of piezoelectric polymer. A ratio of a surface area (a1) of the first patterned piezoelectric layer 3413 to a total surface area (A1) of the positive and negative patterned electrodes 3411, 3412 ranges from 0.40 to 0.85.

In an embodiment shown in FIGS. 4 and 8, the first patterned piezoelectric layer 3413 is formed on the positive patterned electrode 3411.

Figure 6:
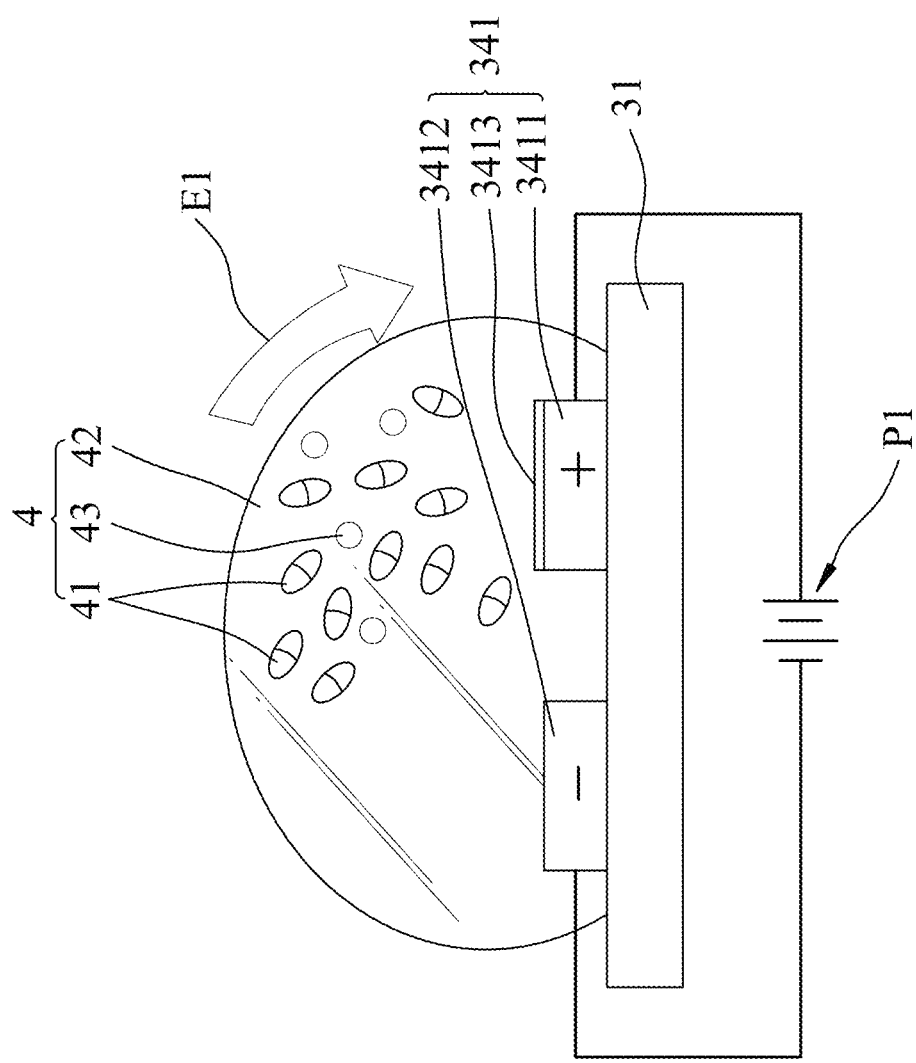
FIG. 6 is a schematic side view illustrating formation of a first patterned piezoelectric layer of the micro-machined transmitter of FIG. 5.

In Example 1, the first patterned piezoelectric layer 3413 is formed on the positive patterned electrode 3411 by electrodeposition. As shown in FIG. 6, a first direct current (DC) voltage from a first power supply (P1) is applied between the positive and negative patterned electrodes 3411, 3412 to form a first electric field (E1). Under the influence of the first electric field (E1), a plurality of piezoelectric particles 41 within a droplet of a piezoelectric suspension 4 move toward and are deposited on the positive patterned electrode 3411 to form the first patterned piezoelectric layer 3413. The piezoelectric particles 41 are made of piezoelectric polymer. In Example 1, the piezoelectric particles 41 are made of poly(vinylidene difluoride-co-trifluoroethylene) [(P(VDF-TrFE)] which has a concentration of 4.55 g/L in the piezoelectric suspension 4. The piezoelectric suspension 4 includes a dispersant 42 for dispersing the piezoelectric particles 41, and a solution of allyl mercaptan 43 in which the allyl mercaptan 43 has a concentration of 60 wt %. The dispersant 42 may be dimethyl sulfoxide (DMSO). The solution of the allyl mercaptan 43 is in an amount of 0.3 wt % based on the total weight of the piezoelectric suspension 4. In Example 1, the droplet of the piezoelectric suspension 4 has a volume of 4 μL, and the first DC voltage (2.5 V) is applied for 1 hour to form 4 μm of the first patterned piezoelectric layer 3413. The remaining component(s) (such as DMSO) on the first electrode set 3410 is removed by washing with deionized water.

It should be noted that because addition of the allyl mercaptan 43 in the piezoelectric suspension 4 facilitates formation of an Au—S bond between the first patterned piezoelectric layer 3413 and the positive patterned electrode 3411, the first patterned piezoelectric layer 3413 is less likely to detach from the positive patterned electrode 3411.

The micro-machined receiver 342 includes a second electrode set 3420 and a second patterned piezoelectric layer 3423.

The second electrode set 3420 is formed on an upper surface of the lower carrier plate 32, and has a positive patterned electrode 3421 and a negative patterned electrode 3422 which is separated from the positive patterned electrode 3421 by a second gap 3424 therebetween. In Example 1, as shown in FIG. 4, the positive and negative patterned electrodes 3421, 3422 are arranged in a concentric manner, and each is made of gold.

The second patterned piezoelectric layer 3423 is formed on one of the positive and negative patterned electrodes 3421, 3422 of the second electrode set 3420, and is in a position corresponding to the first patterned piezoelectric layer 3413 such that when the acoustic wave (W) is transmitted to the second patterned piezoelectric layer 3423 through the testing solution 6, an acoustic wave-induced voltage ($V_2$) is generated between the positive and negative patterned electrodes 3421, 3422 of the second electrode set 3420 via a piezoelectric effect of the second patterned piezoelectric layer 3423 (see FIGS. 4 and 8). The second patterned piezoelectric layer 3423 is made of piezoelectric polymer. A ratio of a surface area (a2) of the second patterned piezoelectric layer 3423 to a total surface area (A2) of the positive and negative patterned electrodes 3421, 3422 ranges from 0.40 to 0.85.

In an embodiment shown in FIGS. 4 and 8, the second patterned piezoelectric layer 3423 is formed on the positive patterned electrode 3421.

Figure 5:
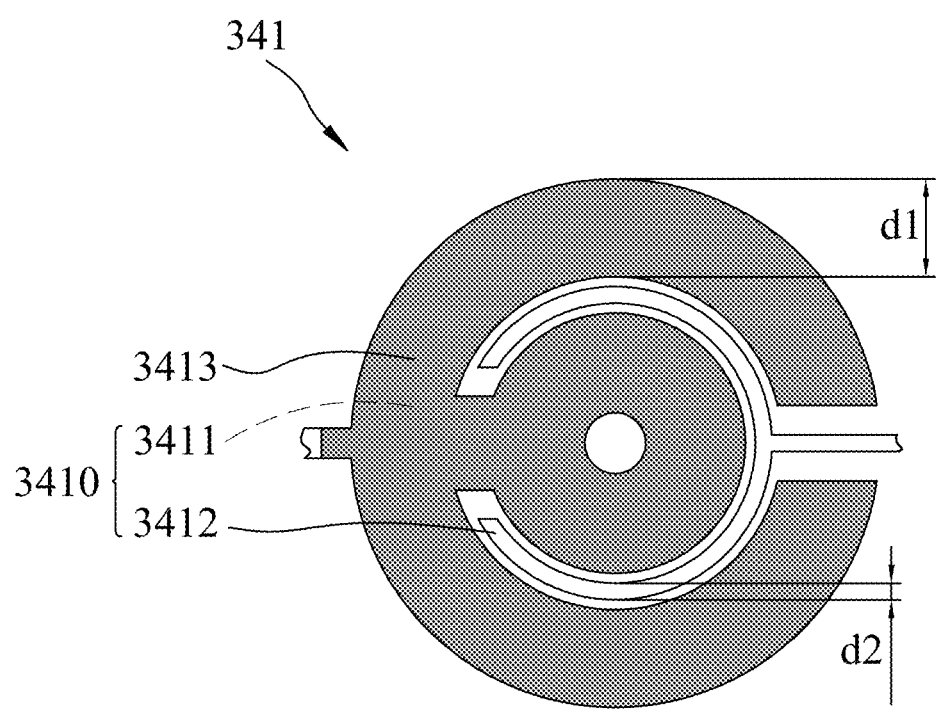
FIG. 5 is a fragmentary plan view of a mi transmitter in the micro-machined transceiver of FIG. 4 in an assembled state.

In Example 1, as shown in FIGS. 4 and 5, each of the positive patterned electrodes 3411, 3421 has a width (d1) of 120 μm, and each of the negative patterned electrodes 3412, 3422 has a width (d2) of 20 μm. Each of the ratios of a1/A1 and a2/A2 is 0.8264.

In Example 1, the second patterned piezoelectric layer 3423 is formed on the positive patterned electrode 3411 by electrodeposition, which is similar to the process for making the first patterned piezoelectric layer 3413.

The first molecularly imprinted polymer layer 343 is formed on one of the first and second patterned piezoelectric layers 3413, 3423, and is configured to recognize and bind the target compound 61 in the testing solution 6 such that an amplitude of the acoustic wave-induced voltage ($V_2$) is varied in response to the concentration of the target compound 61 in the testing solution 6. The first molecularly imprinted polymer layer 343 is made of molecularly imprinted polymer (MIP) and serves as artificially-made antibody. Please note that the first molecularly imprinted polymer layer 343 can specifically recognize and bind the target compound 61 to ensure that the amplitude of the acoustic wave-induced voltage ($V_2$) is influenced by the target compound 61. Therefore, the biosensors 3 may have an improved sensitivity to the target compound 61.

In an embodiment shown in FIG. 8, the first molecularly imprinted polymer layer 343 is formed on the second patterned piezoelectric layers 3423.

Figure 7:
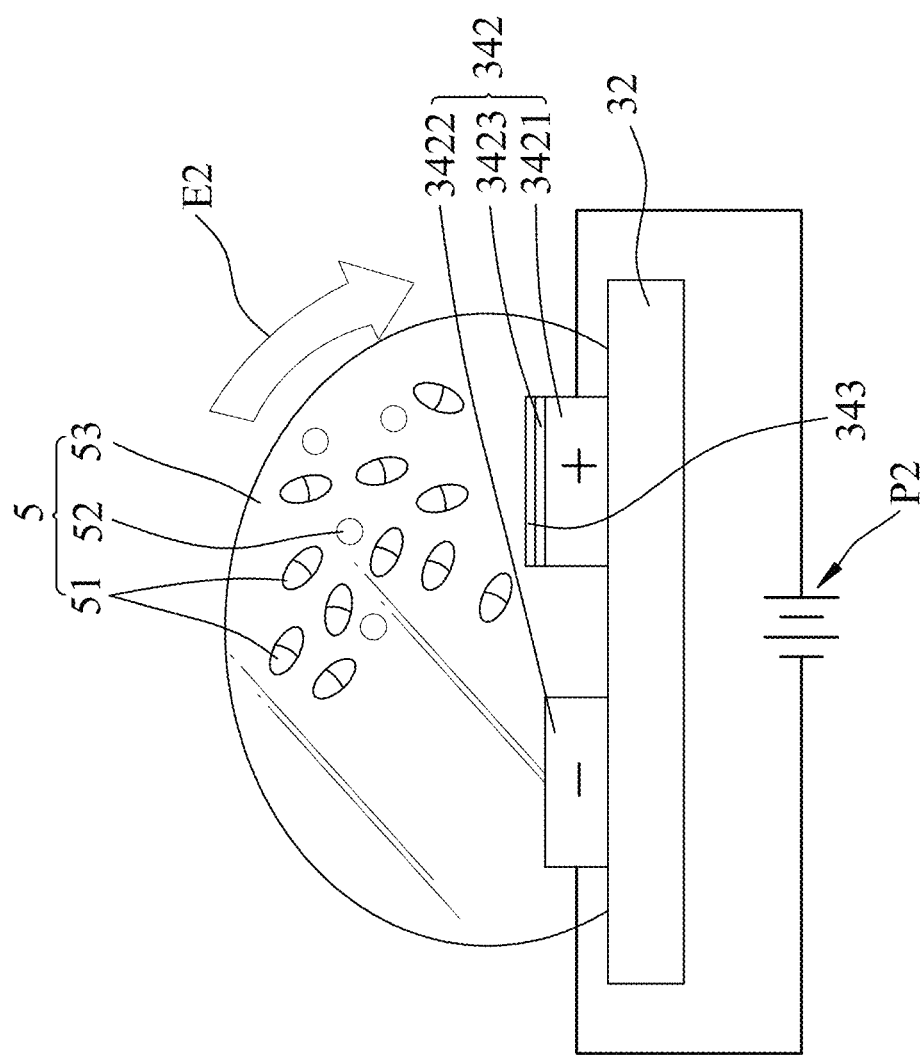
FIG. 7 is a schematic side view illustrating formation of a first molecularly imprinted polymer layer on a micro-machined receiver of the micro-machined transceiver of FIG. 4.

In Example 1, the first molecularly imprinted polymer layer 343 is formed on the second patterned piezoelectric layers 3423 by electrodeposition. As shown in FIG. 7, a second direct current (DC) voltage from a second power supply (P2) is applied between the positive and negative patterned electrodes 3421, 3422 to form a second electric field (E2). Under the influence of the second electric field (E2), functional monomers 51 and templates 52 within a droplet of a MIP suspension 5 move toward the second patterned piezoelectric layer 3423, and the functional monomers 51 are cross-linked around the templates 52 on the second patterned piezoelectric layer 3423. Thereafter, the templates 52 are removed to form the first molecularly imprinted polymer layer 343. In Example 1, the functional monomers 51 is o-phenylenediamine (o-pd), and the templates 52 are molecules of doxycycline. The MIP suspension 5 may be made by (i) preparing a buffer solution 53 consisting of water (20 ml), NaOH (0.03 g), and acetic acid (0.8 g), and (ii) adding o-phenylenediamine (0.016 g) and doxycycline (0.038 g) to the buffer solution 53. In Example 1, the droplet of the MIP suspension 5 has a volume of 4 μL, and the second DC voltage (1.8 V) is applied for 30 minutes to permit the o-phenylenediamine particles 51 to be cross-linked to poly(o-phenylenediamine) around the templates 52 on the second patterned piezoelectric layer 3423. The buffer solution 53 is then removed by washing with deionized water. Finally, the templates 52 are removed by washing with methanol to thereby obtain 1~10 μm of the first molecularly imprinted polymer layer 343.

Second Embodiment

Figure 9:
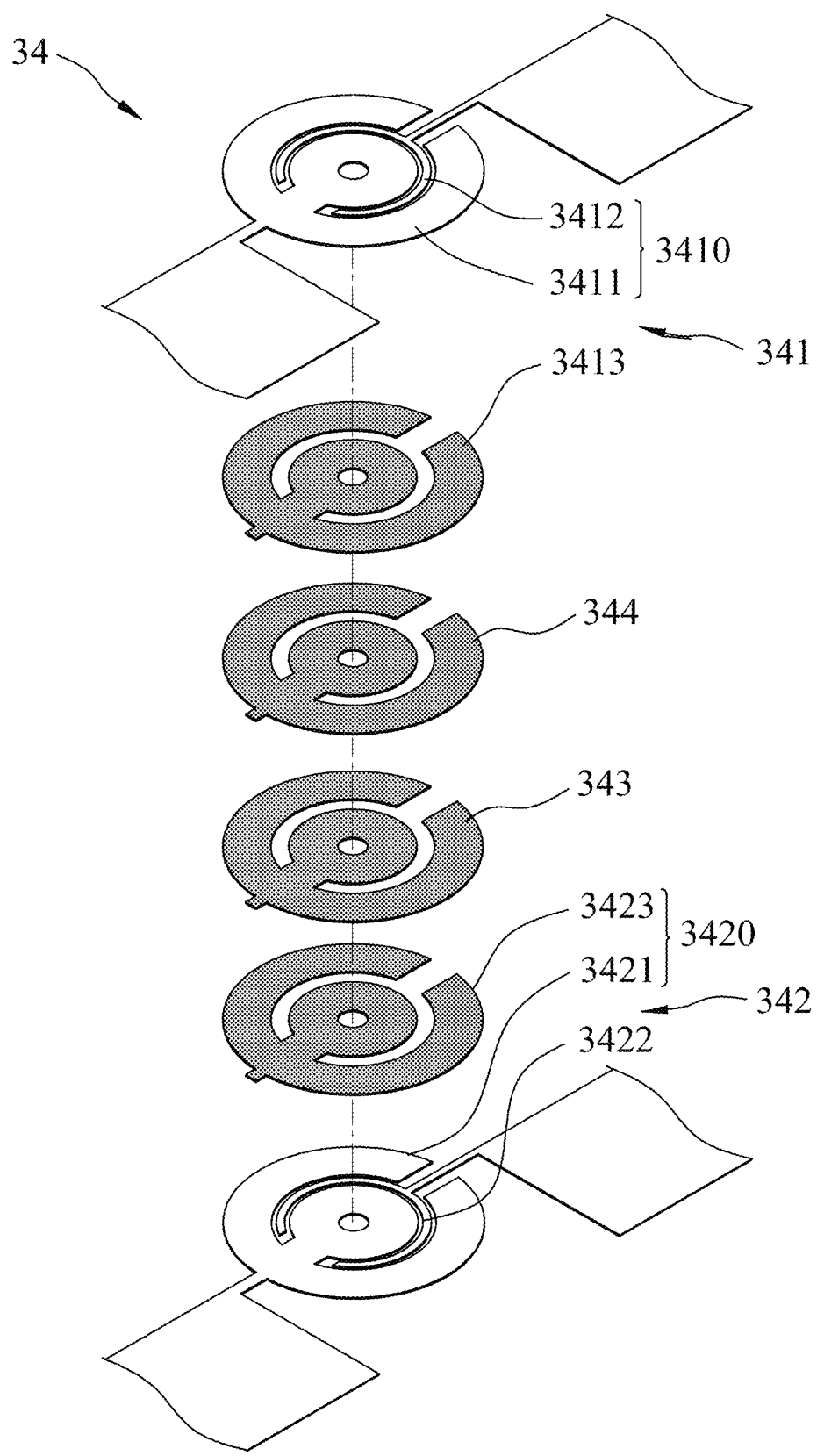
FIG. 9 is a fragmentary exploded perspective view of a micro-machined transceiver in a biosensor according to a second embodiment of the disclosure.

FIG. 9 shows a micro-machined transceiver 34 in a biosensor according to a second embodiment of the disclosure. The micro-machined transceiver 34 of the second embodiment is similar to that of the first embodiment, except that, in the second embodiment, the micro-machined transceiver 34 further includes a second molecularly imprinted polymer layer 344 which is formed on the first patterned piezoelectric layer 3413, and which is configured to recognize and bind the target compound 61. The second molecularly imprinted polymer layer 344 is made by a process similar to the process for making the first molecularly imprinted polymer layer 343.

In this embodiment, an increased amount of the target compound 61 shown in FIG. 8 may be caught between the micro-machined transmitter 341 and the micro-machined receiver 342, and thus, the biosensor(s) 3 may have a further improved sensitivity to the target compound 61.

Third Embodiment

Figure 10:
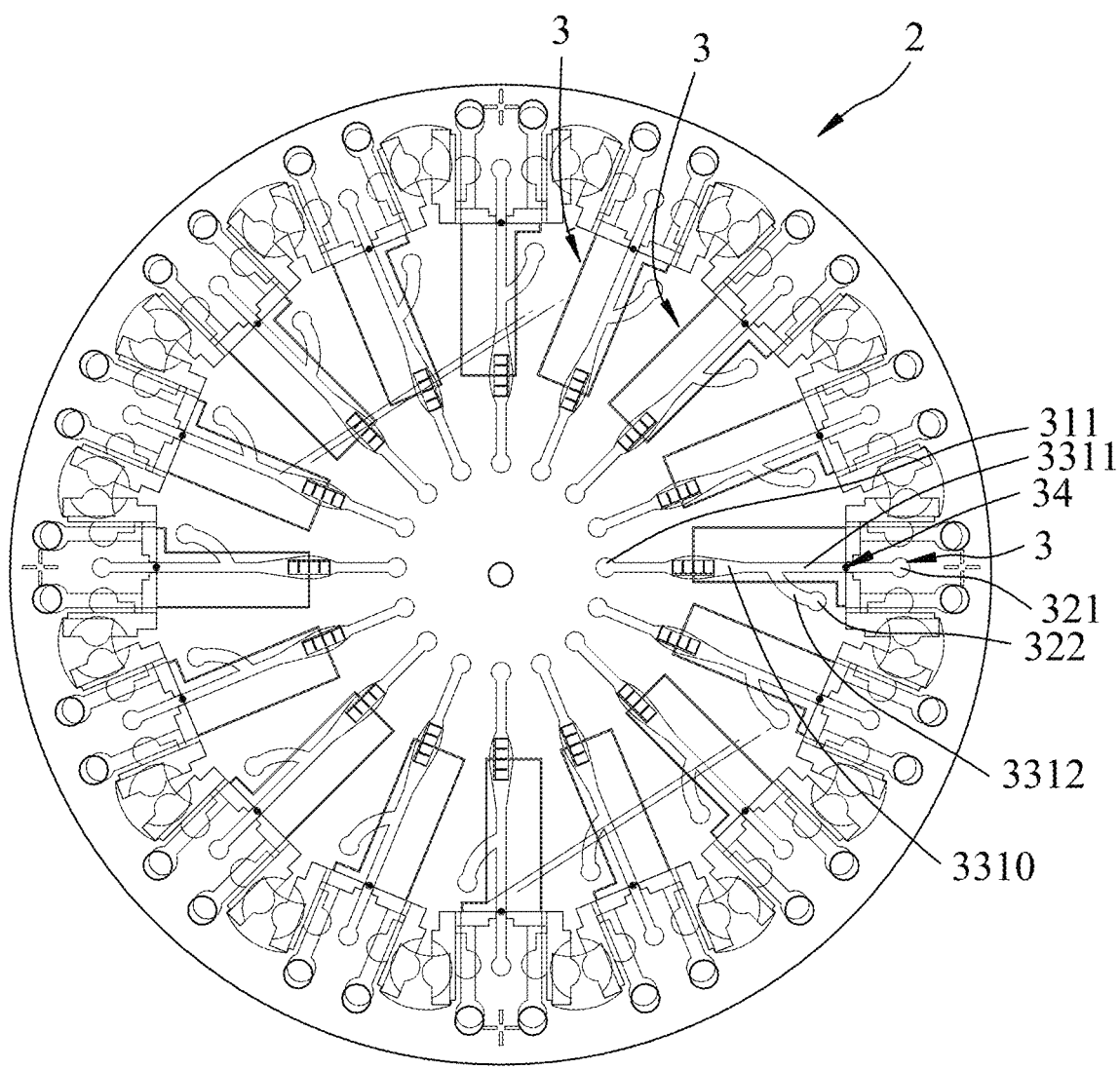
FIG. 10 is a plan view of a sensor disc including a plurality of biosensors according to a third embodiment of the disclosure.
Figure 11:
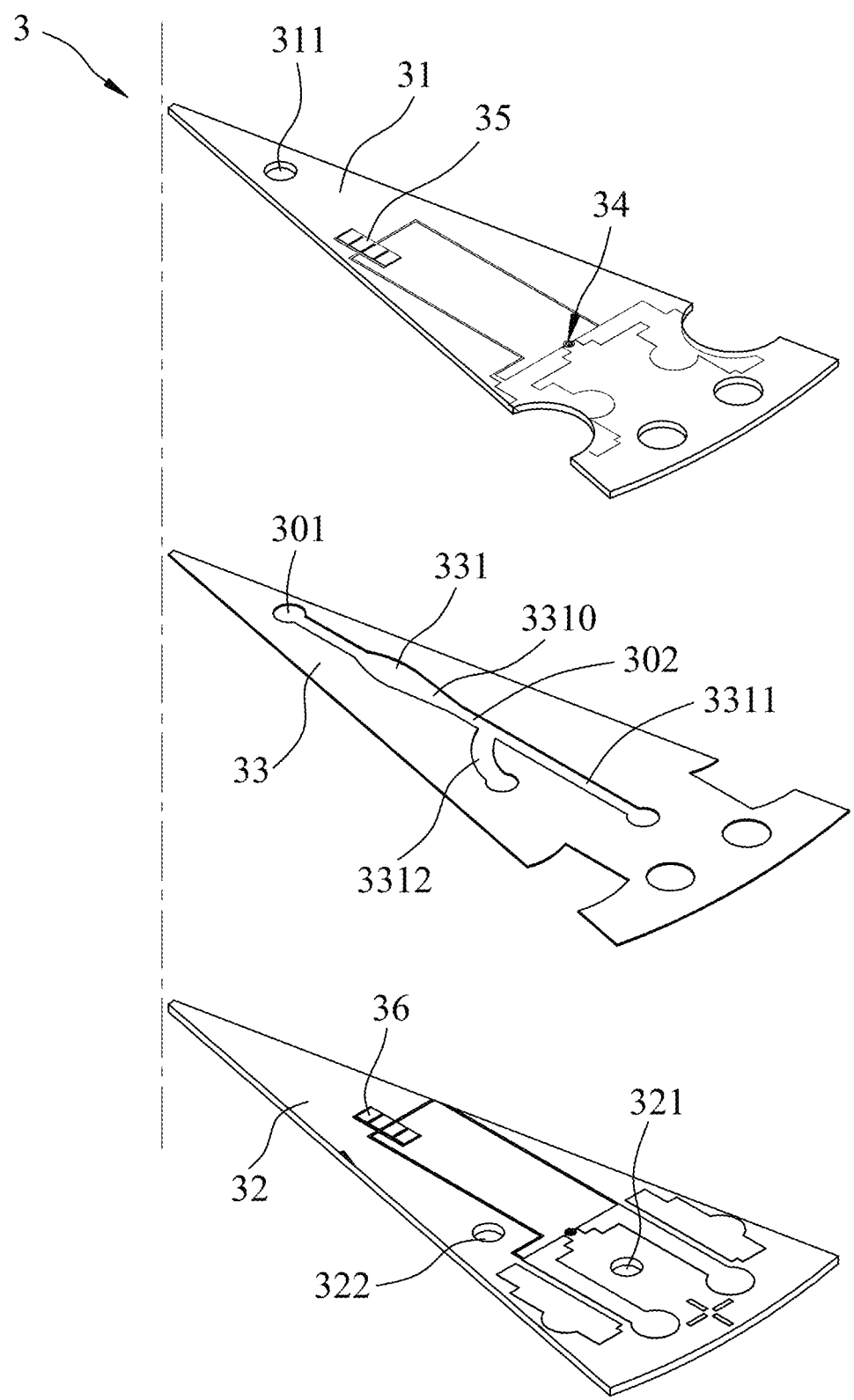
FIG. 11 is a fragmentary exploded perspective view of one of the biosensors of the third embodiment.

FIGS. 10 and 11 show a sensor disc 2 which includes a plurality of biosensors 3 according to a third embodiment of the disclosure. Each of the biosensors 3 of the third embodiment is similar to the first or second embodiment, except that in the third embodiment, each of the biosensor 3 further includes a second outlet port 322 formed in the lower carrier plate 32 for discharging the testing solution 6 (which is shown in FIG. 8) out of the micro-channel 311. In this embodiment, the micro-channel 331 includes an introducing channel portion 3310, a first sub-channel portion 3311, and a second sub-channel portion 3312.

The introducing channel portion 3310 has a proximal end 301 and distal end 302 relative to the inlet port 311. The first sub-channel portion 3311 is disposed downstream of the distal end 302 and upstream of the first outlet port 321 to permit the first molecularly imprinted polymer layer 343 to bind the target compound 61 of the testing solution 60 in the first sub-channel portion 3311. The second sub-channel portion 3312 is disposed downstream of the distal end 302 and upstream of the second outlet port 322.

In an embodiment shown in FIGS. 10 and 11, each of the biosensors 3 includes a third molecularly imprinted polymer layer 35 and a fourth molecularly imprinted polymer layer 36. The third molecularly imprinted polymer layer 35 is formed on the lower surface of the upper carrier plate 31, and is configured to recognize and bind the target compound 61 of the testing solution 6 in the introducing channel portion 3310. The fourth molecularly imprinted polymer layer 36 is formed on the upper surface of the lower carrier plate 32, and is configured to recognize and bind the target compound 61 of the testing solution 6 in the introducing channel portion 3310.

Each of the third and fourth molecularly imprinted polymer layers 35, 36 is formed on a corresponding one of the upper and lower carrier plates 31, 32 through an electrically conductive patterned layer (not shown) with positive and negative portions which are electrically and respectively connected to the positive and negative patterned electrodes of a respective one of the first and second electrode sets 3410, 3420. Each of the third and fourth molecularly imprinted polymer layers 35, 36 is made by a process similar to the process for making the first molecularly imprinted polymer layer 343. In an embodiment, the electrically conductive patterned layer is made of gold.

In operation, the testing solution 6 including the target compound 61 is introduced into the introducing channel portion 3310 via the inlet port 311, and is allowed to stay at the introducing channel portion 3310 for a time period so as to permit the target compound 61 to be bound by the third and fourth molecularly imprinted polymer layers 35, 36. Deionized water is then introduced into the introducing channel portion 3310 via the inlet port 311, flows through the second sub-channel portion 3312, and is discharged from the second outlet port 322 so as to clean the introducing channel portion 3310. Thereafter, an extraction solution is introduced into the introducing channel portion 3310 via the inlet port 311, and is allowed to stay at the introducing channel portion 3310 for a time period (e.g., 1 minute) so as to extract the target compound 61 from the third and fourth molecularly imprinted polymer layers 35, 36 into the extraction solution. Next, the target compound-containing extraction solution flows through the first sub-channel portion 3311 to the micro-machined transceiver 34 for detection prior to being discharged from the first outlet port 321.

It should be noted that in this embodiment, with the provision of the third and fourth molecularly imprinted polymer layers 35, 36, the target compound can be separated from other components in the testing solution. In addition, with the provision of the first and second molecularly imprinted polymer layers 343, 344, the target compound can be caught between the micro-machined transmitter 341 and the micro-machined receiver 342. Therefore, the output signal (the amplitude of the acoustic wave-induced voltage ($V_2$)) of the biosensor(s) 3 is less likely to be influenced by other components in the testing solution.

The embodiments of the disclosure will now be explained in more detail below by way of the following example and comparative example. The example is intended for purposes of illustration only and is not intended to limit the scope of the present disclosure.

Example 1

The biosensors of Example 1 have the same configuration as those disclosed in the first embodiment, and the details of the biosensors of Example 1 are also described in the first embodiment.

Comparative Example

The biosensors of Comparative Example are similar to those of Example 1 except that the biosensors of Comparative Example do not have the first molecularly imprinted polymer layer 343 and are similar to the conventional biosensors disclosed in US 2018/0331278 A1.

Sensitivity Test

Three biosensors of Example 1 for detection of doxycycline and three biosensors of Comparative Example were prepared. In this test, an alternative voltage ($V_1$, 10 kHz, 4V) was applied between the positive and negative patterned electrodes of the micro-machined transceiver of each of the biosensors, and an acoustic wave-induced voltage ($V_2$) between the positive and negative patterned electrodes of the micro-machined receiver of the corresponding biosensor was measured while a blank solution or a testing solution was directed to flow through the micro-channel of the corresponding biosensor. The blank solution was a sodium dodecyl sulfate (SDS) aqueous solution, and the testing solution was a SDS aqueous solution containing a target compound (doxycycline, 250 ppb). The sensitivity for each biosensor was calculated using the following Equation (I):

$$\text{Sensitivity} = \frac{|V_{2b} - V_{2T}|}{C} \quad (I)$$

where $V_{2b}$ is the acoustic wave-induced voltage for the blank solution, $V_{2T}$ is the acoustic wave-induced voltage for the testing solution, and C is a concentration (ppb) of the target compound.

Figure 12:
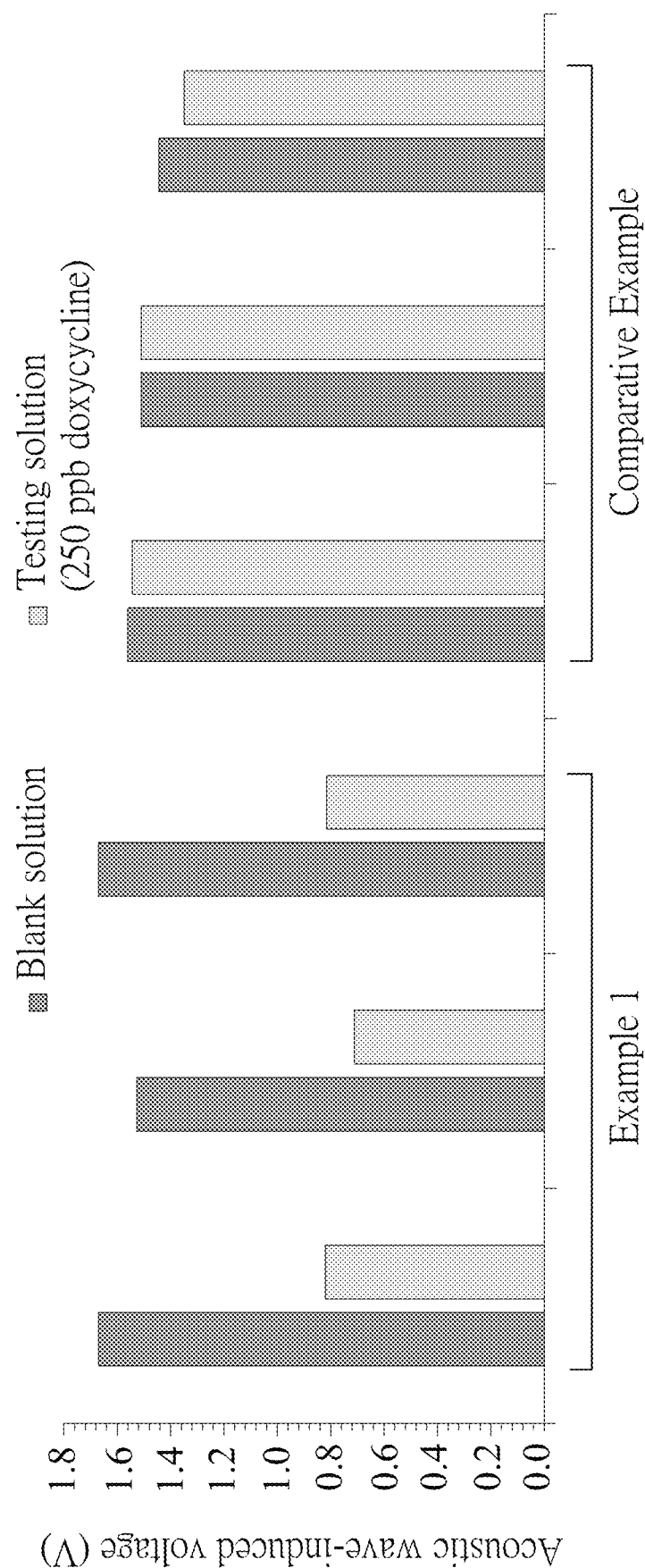
FIG. 12 is a bar diagram illustrating acoustic wave-induced voltages measured from the biosensors of Example 1 and comparative Example when a blank solution or a testing solution was directed to flow through a micro-channel of a corresponding one of the biosensors.

The test results for each of the biosensors are shown in Table 1 and FIG. 12.

TABLE 1

|  | Biosensors of Example 1 | | | Biosensors of Comparative Example | | |
| --- | --- | --- | --- | --- | --- | --- |
| $\|V_{2b} - V_{2T}\|$ (mV) | 850 | 819 | 866 | 11 | 4 | 97 |
| Sensitivity (mV/ppb) | 3.400 | 3.276 | 3.464 | 0.044 | 0.016 | 0.388 |
| Average sensitivity (mV/ppb) |  | 3.380 |  |  | 0.149 |  |

From the results shown in Table 1, it can be found that with the provision of the first molecularly imprinted polymer layer 343 in the biosensor 3 of Example 1, the biosensors 3 of Example 1 may have at least 22.68 times greater sensitivity to the target compound (doxycycline) than the biosensors of Comparative Example.

Specificity Test

Figure 13:
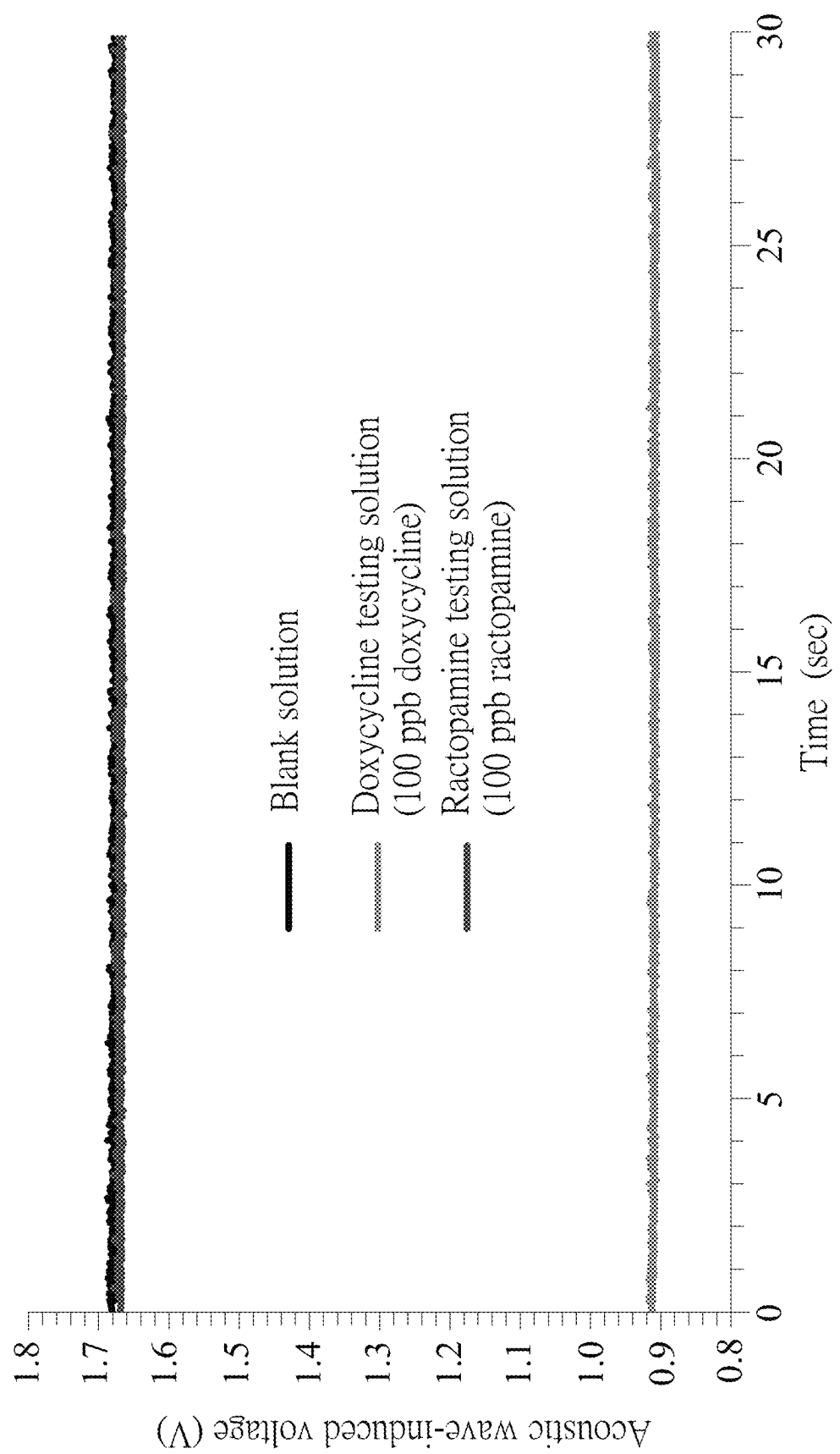
FIG. 13 is a diagram illustrating acoustic wave-induced voltages of the biosensor of Example 1 when each of a blank solution, a doxycycline testing solution, and a rectopamine testing solution was directed to flow through a micro-channel of the biosensor.

A biosensor of Example 1 for detection of doxycycline was tested using a blank solution, a doxycycline testing solution, and a ractopamine testing solution in a manner similar to the sensitivity test. In this test, the blank solution was a SDS aqueous solution. The doxycycline testing solution was a SDS aqueous solution containing a target compound (doxycycline, 100 ppb). The ractopamine testing solution was a SDS aqueous solution containing a target compound (ractopamine, 100 ppb). FIG. 13 shows an acoustic wave-induced voltage ($V_2$) measured from the biosensor of Example 1 while each of the blank solution, the doxycycline testing solution, and the ractopamine testing solution was directed to flow through the micro-channel of the biosensor. The sensitivities of the biosensor of Example 1 relative to doxycycline and ractopamine were calculated according to the above Equation 1, and the results are listed in Table 2.

TABLE 2

|  | Doxycycline (100 ppb) | Ractopamine (100 ppb) |
| --- | --- | --- |
| Sensitivity (mV/ppb) | 7.69 | 0.08 |

From the result shown in Table 2, it can be found that the biosensor of Example 1 for detection of doxycycline can specifically reflect the presence of doxycycline.

Reuse Test

In this test, the biosensor of Example 1 was used for detection of drug molecules, such as doxycycline. The acoustic wave-induced voltages ($V_2$) of the biosensor of Example 1 were measured in a manner similar to the sensitivity test during a period when a blank solution, a first testing solution, the blank solution, a second testing solution, the blank solution, a third testing solution were directed to flow through the micro-channel in sequence. Between each measurement, the micro-channel was cleaned using deionized water twice. In this test, the blank solution was a SDS aqueous solution. The first, second, and third testing solutions included a meat extraction in different concentrations (50 ppb, 100 ppb, 250 ppb). The meat extraction was prepared from pork and was obtained from Animal Technology Laboratories of Agricultural Technology Research Institute, Taiwan. The process for preparing the meat extraction is described as follow. The pork was processed into ground pork. 2 gram of the ground pork and beads for homogenizing were added to 10 ml of acetonitrile aqueous solution (80%), followed by vortex oscillation for 1 minute and centrifugation for 5 minutes to collect a first supernatant liquid. The first supernatant liquid was then poured into a centrifugation tube with $C_{18}$ powder (5 g), followed by vortex oscillation for 1 minute and centrifugation for 5 minutes to collect a second supernatant liquid. The second supernatant liquid was poured into another centrifugation tube with $Na_2SO_4$ powder (4 g), followed by vortex oscillation for 1 minute and centrifugation for 5 minutes to collect a third supernatant liquid. Next, the third supernatant liquid (5 ml) was dried and then dissolved into a formic acid aqueous solution (1 ml, 0.1 wt %), followed by filtration using a modified polyvinylidene difluoride (mPVDF) membrane (0.22 microns) to obtain a liquid of the meat extraction.

Figure 14:
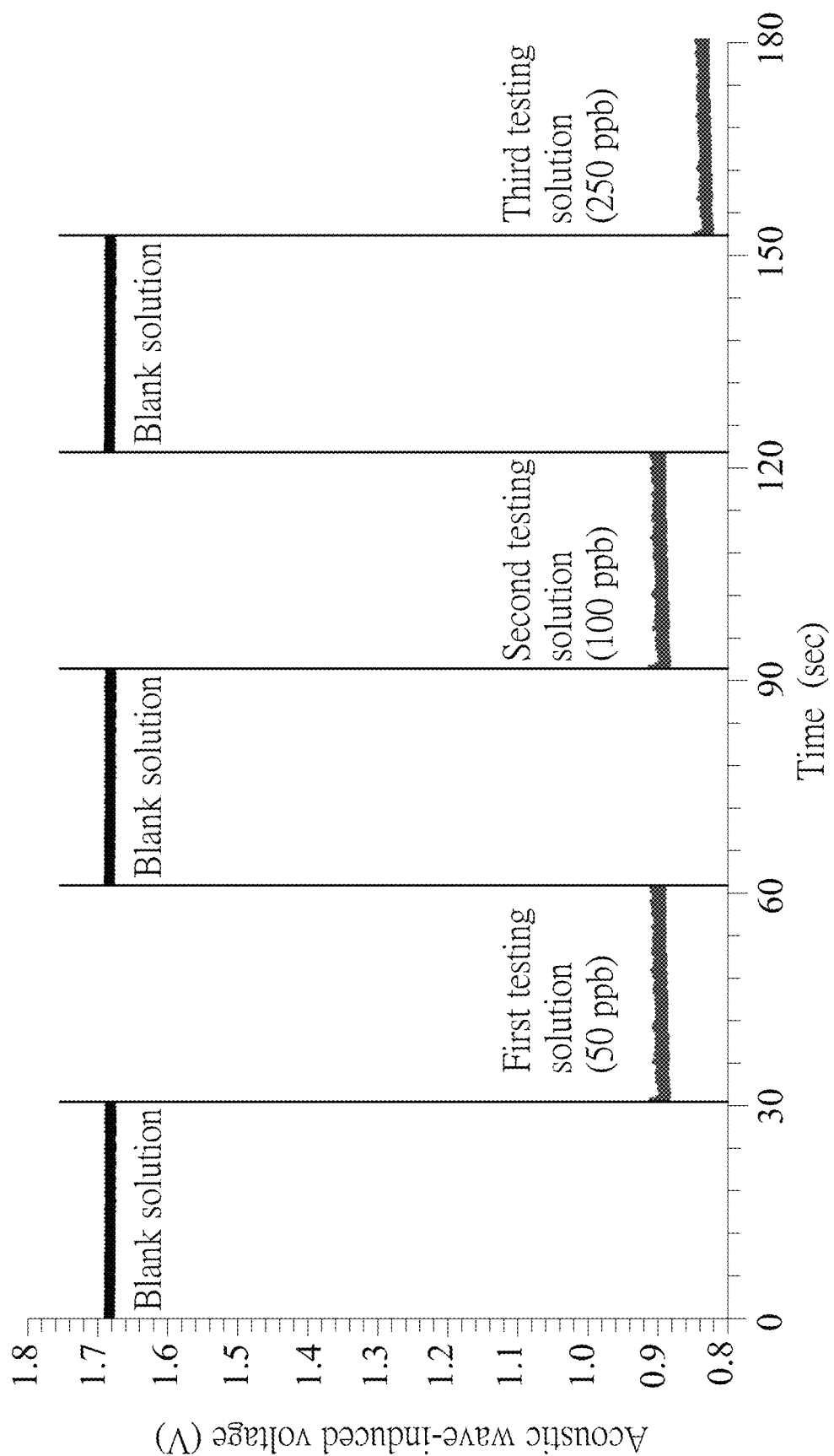
FIG. 14 is a diagram illustrating acoustic wave-induced voltages of the biosensor of Example 1 when the blank solutions and testing solutions were sequentially directed to flow through a micro-channel of the biosensor.

The results are shown in FIG. 14.

From FIG. 14, a great difference can be observed between the acoustic wave-induced voltages of the blank solution and each of the first, second, and third testing solutions. Therefore, the biosensor(s) of Example 1 may be reused several times.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A biosensor for detecting the presence of a target compound in a testing solution, comprising:
   an upper carrier plate;
   a lower carrier plate which is spaced apart from said upper carrier plate to define an accommodation zone therebetween;
   a spacer film having a micro-channel, and disposed in said accommodation zone;
   an inlet port and a first outlet port each of which is formed in one of said upper and lower carrier plates, said inlet port being configured to permit the testing solution to be introduced into said micro-channel, said first outlet port being configured to permit the testing solution to be discharged out of said micro-channel;
   a micro-machined transceiver which includes
      a micro-machined transmitter including
         a first electrode set formed on a lower surface of said upper carrier plate, and having a positive patterned electrode and a negative patterned electrode which is separated from said positive patterned electrode by a first gap therebetween, and
         a first patterned piezoelectric layer which is formed on one of said positive and negative patterned electrodes of said first electrode set, and which is configured such that when an alternate voltage is applied to said positive and negative patterned electrodes of said first electrode set, an acoustic wave is generated via a converse piezoelectric effect of said first patterned piezoelectric layer, and
      a micro-machined receiver including
         a second electrode set formed on an upper surface of said lower carrier plate, and having a positive patterned electrode and a negative patterned electrode which is separated from said positive patterned electrode by a second gap therebetween, and
         a second patterned piezoelectric layer which is formed on one of said positive and negative patterned electrodes of said second electrode set, and which is in a position corresponding to said first patterned piezoelectric layer such that when the acoustic wave is transmitted to said second patterned piezoelectric layer through the testing solution, an acoustic wave-induced voltage is generated between said positive and negative patterned electrodes of said second electrode set via a piezoelectric effect of said second patterned piezoelectric layer; and
   a first molecularly imprinted polymer layer which is formed on one of said first and second patterned piezoelectric layers, and which is configured to recognize and bind the target compound in the testing solution such that an amplitude of the acoustic wave-induced voltage is varied in response to the concentration of the target compound in the testing solution,
   wherein each of said first and second patterned piezoelectric layers is made of a piezoelectric polymer, and said first molecularly imprinted polymer layer is formed through electrodeposition to have a thickness ranging from 1 μm to 10 μm, and to have a pattern corresponding to a pattern of said one of said first and second patterned piezoelectric layers.

2. The biosensor according to claim 1, wherein said first molecularly imprinted polymer layer is formed on said second patterned piezoelectric layer, and said micro-machined transceiver further includes a second molecularly imprinted polymer layer which is formed on said first patterned piezoelectric layer, and which is configured to recognize and bind the target compound.

3. The biosensor according to claim 1, wherein said inlet port and said first outlet port are formed in said upper and lower carrier plates, respectively.

4. The biosensor according to claim 3, which further comprises a second outlet port which is formed in said lower carrier plate for discharging the testing solution out of said micro-channel, said micro-channel including
- an introducing channel portion having a proximal end and distal end relative to said inlet port,
- a first sub-channel portion disposed downstream of said distal end and upstream of said first outlet port to permit said first molecularly imprinted polymer layer to bind the target compound of the testing solution in the first sub-channel portion, and
- a second sub-channel portion disposed downstream of said distal end and upstream of said second outlet port.

5. The biosensor according to claim 4, further comprising a third molecularly imprinted polymer layer which is formed on one of said lower surface of said upper carrier plate and said upper surface of said lower carrier plate, and which is configured to recognize and bind the target compound of the testing solution in said introducing channel portion.

6. The biosensor according to claim 5, wherein said third molecularly imprinted polymer layer is formed on said lower surface of said upper carrier plate, said biosensor further comprising a fourth molecularly imprinted polymer layer which is formed on said upper surface of said lower carrier plate, and which is configured to recognize and bind the target compound of the testing solution in said introducing channel portion.

7. The biosensor according to claim 1, wherein said micro-machined transceiver defines an axis normal to both said upper and lower carrier plates, and said first molecularly imprinted polymer layer has:
- an inner portion extending about the axis,
- an outer portion extending to surround said inner portion, and
- an interconnecting portion interconnecting said inner and outer portions.

* * * * *